United States Patent [19]
Heifetz et al.

[11] 3,778,528
[45] Dec. 11, 1973

[54] MODULAR BUILDING UNIT AND METHOD FOR MAKING SAME

[76] Inventors: Saul Heifetz, 3 Ulman Ter.; George Mandelbaum, 3 Windsor Ter.; Irwin Kushner, 1 Ackertown Rd., all of Monsey, N.Y. 10592

[22] Filed: Apr. 27, 1972

[21] Appl. No.: 247,986

[52] U.S. Cl.......................... 174/48, 52/79, 52/220, 52/309
[51] Int. Cl............................................. H02g 3/26
[58] Field of Search .................... 174/48, 49; 52/79, 52/236, 309, 220, 221, 238

[56] References Cited
UNITED STATES PATENTS

| | | | |
|---|---|---|---|
| 3,707,165 | 12/1972 | Stahl | 52/220 X |
| 3,281,510 | 10/1966 | Lovret | 52/309 |
| 2,691,291 | 10/1954 | Henderson | 52/221 X |
| 2,037,895 | 4/1936 | Gugler | 174/49 X |
| 3,562,985 | 2/1971 | Nicosia | 52/220 X |
| 3,690,077 | 9/1972 | Dalgliesh | 52/79 |
| 3,195,191 | 7/1965 | Neisewander | 52/238 X |
| 3,310,917 | 3/1967 | Simon | 52/309 X |
| 3,479,779 | 11/1969 | Ziegler | 52/309 X |

FOREIGN PATENTS OR APPLICATIONS

| | | | |
|---|---|---|---|
| 766,840 | 9/1967 | Canada | 52/79 |

*Primary Examiner*—Bernard A. Gilheany
*Assistant Examiner*—D. A. Tone
*Attorney*—Marvin B. Rosenberg

[57] ABSTRACT

A prefabricated building module of substantially all plastic construction is provided which can comprise an entire housing unit of one or more rooms thereof. The module is formed in a virtually completed state ready for delivery to a building site for final erection and finishing. The module has walls, floor and ceiling and may include interior partitions to section the unit into a plurality of rooms and to house plumbing, as well as windows, doorways, and doors. The walls, floor and ceiling are formed from inner and outer shells of molded reinforced plastic material. An insulating core of polyurethane foam material is sandwiched between the shells. All of the electrical, heating, ventilation, air-conditioning and/or gas conduits, junction boxes, terminals and the like can be provided in the insulated core in place and ready for connection and use at the building site. A method for forming the building module unit is also provided.

10 Claims, 4 Drawing Figures

PATENTED DEC 11 1973 3,778,528

MODULAR BUILDING UNIT AND METHOD FOR MAKING SAME

BACKGROUND OF THE INVENTION

In recent years, the building industry has focused a good deal of attention on mass production and prefabrication techniques and their application to the construction of single and multi-unit and multi-story houses, office buildings and factories. This relatively new interest is based, in part, on the high cost of both skilled and semi-skilled labor employed in conventional construction as well as the high cost of conventional building materials now used. Consequently, mass produced and/or prefabricated building structures have developed from a novelty item into an economic necessity.

Until now, the mass production or prefabrication techniques employed have primarily produced building components rather than completed buildings. The components are produced in a factory and transported to the building site for assemblage on site into a completed building. The use of factory mass production techniques provide modest fabrication costs and transportation of the components to the building site is facilitated by use of light-weight relatively low-cost building materials such as plastics. The patent literature is replete with such prefabrication techniques and a discussion of the more pertinent patents in this area follows.

U. S. Pat. No. 3,533,200 to Zoebelein discloses a prefabricated room assembly, such as a bathroom assembly, which is stackable for easy storage prior to assembly. The room is formed in two prefabricated sections, one of which comprises a lower section. A room "facility" such as a bathtub, a shower, a wash basin or the like is formed integrally with one of the room sections, normally the lower section. The room assembly is made of a material which permits it to be deformable so as to facilitate stacking of the room sections for storage. The room can be made of a molded fiberglass construction which can have a coloring agent included in the manufacture of the assembly to eliminate the necessity for painting.

U. S. Pat. No. 3,281,510 to Lovret discloses the fabrication of a sandwich panel construction having regular interconnections formed therein. The panel consists of a continuous foam core in which passageways are provided for electrical, plumbing, gas conduits and other utilities. The core can be an epoxy foam. The face layers of the foam can be made of plastic sheet materials.

U. S. Pat. No. 3,363,370 to Camoletti et al. discloses a plastic molded prefabricated building element from which dwellings are constructed. The building unit comprises ellipsoid segments of molded plastic material. For example, the segments can be made from a polyurethane foam film reinforced on its two faces with a stratified polyester.

U. S. Pat. No. 3,496,689 to Nerem discloses fabrication of a building panel employing a core of expanded plastic foam, such as expanded polystyrene foam.

U. S. Pat. No. 3,492,767 to Pincus discloses the fabrication, away from the building site, of a utility core which contains the heating unit, electrical system, air conditioning unit and all the necessary plumbing for a building; the core can include one or more bathrooms, laundry room, utility room, kitchen and breakfast room. The core is provided with a chassis which includes a main girder for the building. It is transported to the building site, positioned on a foundation and the remainder of the building is thereafter constructed around the core.

Each of the above patents discloses building elements, cores or panels which may be made in a factory and then must be transported to the building site where the building structure is completed and erected.

U. S. Pat. No. 3,292,327 to Van Der Lely discloses a prefabricated modular building unit adapted to be delivered to the building site as a complete modular unit. Van Der Lely's unit is made of pre-cast concrete. The use of pre-cast concrete, as compared to molded plastics, is undesirable in many applications inasmuch as pre-cast concrete is heavier than plastic modules thereby making transportation of the modules to the building site more difficult; further, plastic can be molded to closer tolerances than concrete which makes on site assembly much easier. This is a substantial problem in pre-cast concrete structures, since often, a relatively small deviation from the desired dimension can make the structure virtually unusable.

Other very similar pre-cast concrete modular units are shown by Stuckey et al. in U. S. Pats. Nos. 3,377,755 and 3,460,308; Henderson in U. S. Pat. No. 2,691,291; Comm in U. S. Pat. No. 3,514,910 and Wysocki in U. S. Pat. No. 3,462,908.

As seen from the above, the prior art discloses in effect, only partial or quasi-prefabrication of plastic modules with substantial work required at the building site to complete the modules. Accordingly, a need still exists in the building industry for a durable, light-weight building module which can be equipped for immediate hook-up to all essential utilities and which can be fabricated in virtually completed form at the factory and then transported to the building site in a form ready for use as a house, building, factory or the like at a building site remote from the factory.

STATEMENT OF THE INVENTION

In accordance with the present invention, there is provided a prefabricated building module of substantially all light-weight plastic construction substantially entirely constructed in a factory remote from the building site. The module can take the form of an entire housing unit, office building, or other residential or commercial structure, of one or more rooms thereof, which is capable of being delivered to the building site in a virtually complete form for final erection and finishing. The building module includes within its walls, conduits, junction boxes, terminals and hardware for telephone, electrical, heating, ventilation, air-conditioning and/or gas services and utilities, and is in a form ready for immediate connection, upon final erection, to corresponding utility sources at the building site. The completed module is fire-retardant, chemically resistant, washable and water-tight. It is also mold, rot, vermin and insect proof.

The prefabricated building module unit of the invention comprises four-sided structures which can include two walls, a floor and a ceiling, being formed of inner and outer shells or skins of molded (preferably reinforced) plastic material. An insulating core of plastic foam material sandwiched between the shells. Electrical, heating, ventilation, air-conditioning and/or gas conduits, and other hardware can be housed in the insulating core. The ends of the building module unit or other two walls may be fabricated with the afore-described plastic structural material of sandwich construction, hereinafter referred to as sandwich panels or sections, or from other materials of conventional type such as plastic sheets, wall board, plastic laminated metal panels, wood panels and the like. The unit can also include temporary or permanent interior partitions which may serve as walls to divide the unit into any number of sections or rooms. Variations in interior layout may be made by changing the partition arrangement. The plumbing conduits may be housed or enclosed by these partitions.

In addition, a method for forming the building module is also provided, which comprises molding matching modular sections by forming inner plastic, preferably reinforced, shell or skin, positioning service conduit facilities such as electrical, telephone, heating, ventilation, air-conditioning and fixtures and/or gas conduits, and other hardware between the shells, forming on the inner shell an insulating core of plastic foam material which follows the contours of the inner shell, molding or outer plastic shell or skin on the insulating core and assembling the sections so as to form a four-sided unitary modular structure. The ends can then be closed off with panels of the afore-described material of sandwich construction or other conventional building material such as wood, aluminum, plastic laminate, and the like to form a weather-tight unitary six-sided structure.

Alternatively, the inner shells can be molded and the utility service means positioned thereon. The outer shell is then molded and positioned in registers with the outer shell. Then an insulating core is formed between the shells embedding therein the utility services means. The resulting sandwich structure can be assembled as noted with additional end sections to form the weather-tight six-sided structure.

In a preferred method of the invention, the building module unit is constructed in two basic sections of plastic material of sandwich construction, namely a lower section which includes the floor of the finished four-sided module and a portion of each of the two side walls and an upper section which includes the ceiling of the four-sided module and a portion of each of the two side walls. The two sections are joined together by conventional means such as by bolts, adhesives and/or fusion as will be described hereinafter, to form the unitary four-sided structure. The open ends are then closed off as described above to form the weather-tight six-sided structure.

In carrying out the method of the invention, each of the sections comprising molded inner and outer shells sandwiching a foam core can be formed as follows.

The mold used in forming the inner shell is fashioned to include blocked out areas for partition grooves, windows, doorways, and the like, in the inner shell. After the inner shell has hardened, the desired service conduit facilities, such as electrical, telephone, heating, gas, ventilation, and the like, are positioned on the interior surface of the inner shell (the surface facing away from the mold).

The insulating core of the foam material is formed on the interior surface of the molded inner shell with the aid of a foam jacket. After the foam hardens, the outer shell is then formed (molded) on the foam core. The inner shell plus foam is thus formed in close registry with and joined to the outer shell in a manner such that the foam material closely follows the contours of the interior surfaces of each of the inner and outer shells.

As noted above, alternatively, the inner and outer molded shells can be positioned with respect to each other in spaced relation, and close registry with the service conduit facilities being positioned between the shells and the insulating core of foam material formed in the spaced between the interior surfaces of the two shells. The foam adheres to the surfaces of the shells without the need for adhesives.

The molds employed for forming the shells are preferably coated with a release agent, such as wax, to facilitate easy release of the shells from the molds.

The method for forming the building module units of the invention can be performed on a mass-production basis employing mass-production techniques known in the art.

The method of the invention is also amenable to the production of individual custom building module units. However, substantially the entire production of the module unit can be carried out on a continuous mass-production basis with a computerized system used to indicate the various modifications of the basic unit to form the custom units.

Further features and advantages of the present invention will appear from the following description, taken in conjunction with the accompanying drawings in which preferred structural embodiments incorporating the principles of the present invention are shown by way of illustrative example wherein:

BRIEF DESCRIPTION OF FIGURES

FIG. 1 is a perspective view of the upper and lower inner shells of the sandwich structure used in fabricating the building module unit of the invention, the inner shell including partition grooves, electrical, telephone, heating, ventilation, gas, wires, pipes, other conduits, terminal and junction boxes and the like.

DESCRIPTION OF DRAWINGS AND SPECIFICATION

Figure 1:
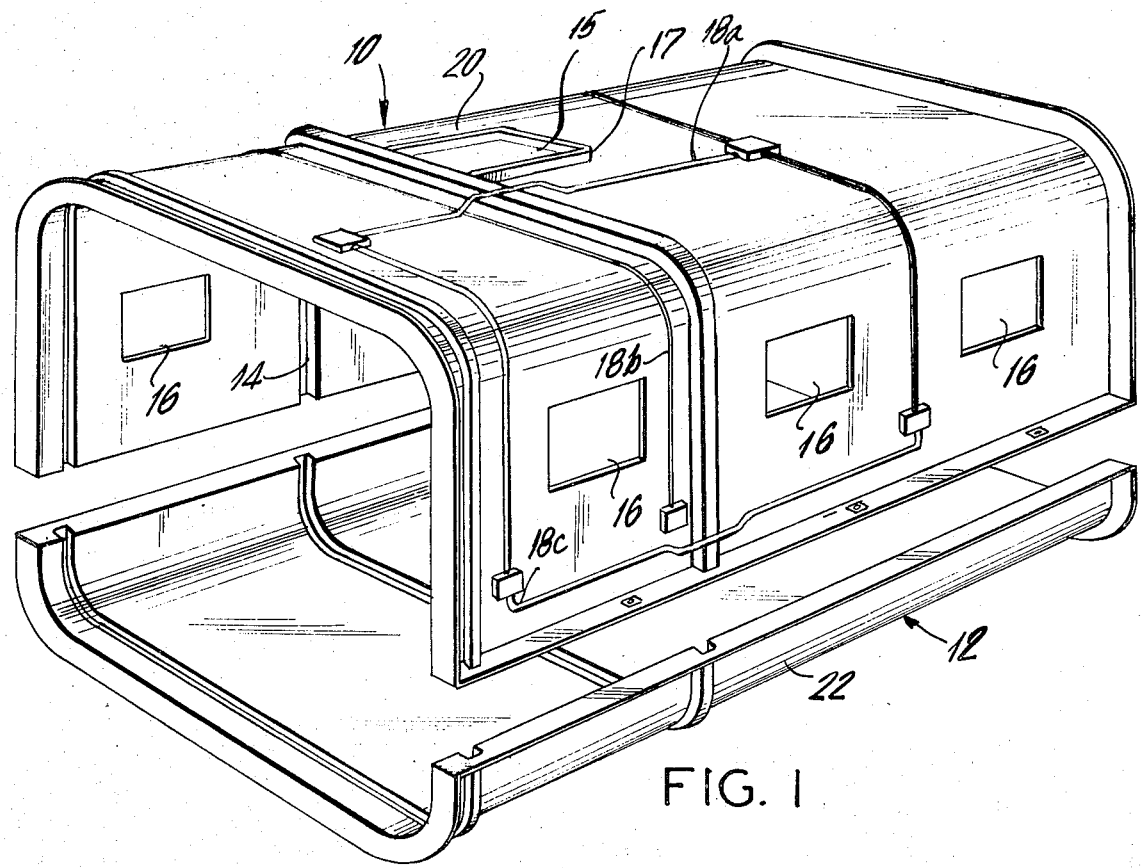

Referring to the Figures, FIG. 1 shows an upper section of the inner shell 10 and a lower section of the inner shell 12. These shells are molded by spray-up molding as described hereinafter and are preferably formed of glass fiber reinforced polyester. The molded upper section 10 includes partition channel or groove 14, opening 15 surrounded by partition channel 17 for housing a plumbing tree, window openings or cutouts 16 which are molded into the shell. The molded shells or sections may be equipped with flanges or other conventional means for joining the two together. After curing and hardening of the shell, telephone, electrical, gas, heating connections, ductwork, junction boxes, terminals and the like generally referred to by the numbers 18a, 18b, 18c are applied and secured to the interior surface of upper inner shell 10 for example, by conventional adhesives.

Thereafter, a foam jacket (not shown) is placed over the interior surfaces 20 and 22 of the upper and lower inner sections 10 and 12, respectively. A liquid foam such as a liquid polyurethane is sprayed between the foam jacket and the interior surfaces 20 and 22 of the sections 10 and 12 to form an insulating core of foam thereon which adheres to the sections 10 and 12 and in the case of section 10, surrounds and embeds all of the heating, gas, and electrical equipment 18a, 18b, 18c.

Figure 2:
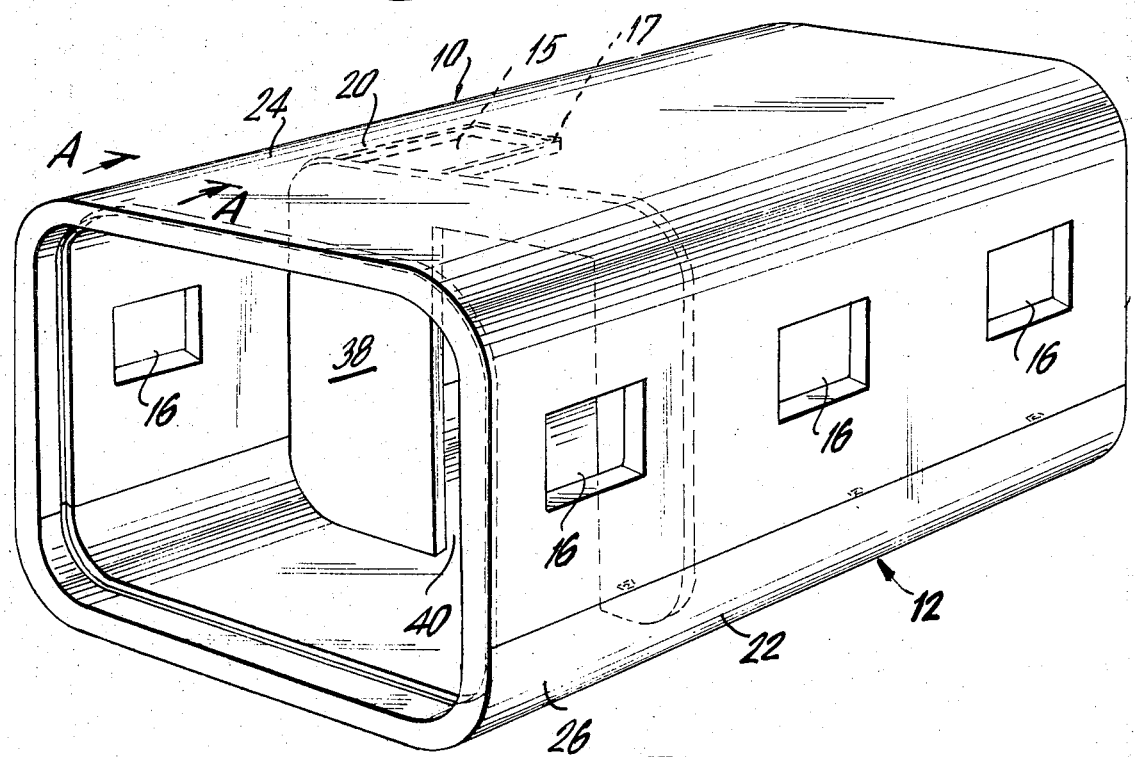
FIG. 2 is a perspective view of a four-sided unitary structure including partitions and insulating core in accordance with the invention.

Referring to FIG. 2, upper and lower outer shells 24 and 26 are molded directly on the foam core formed on the inner shells 10 and 12 employing techniques similar to that used in molding the upper and lower inner shells 10 and 12. Curing and hardening of the outer shells, causes these shells to be bonded to the foam core.

Figures 3, 4:
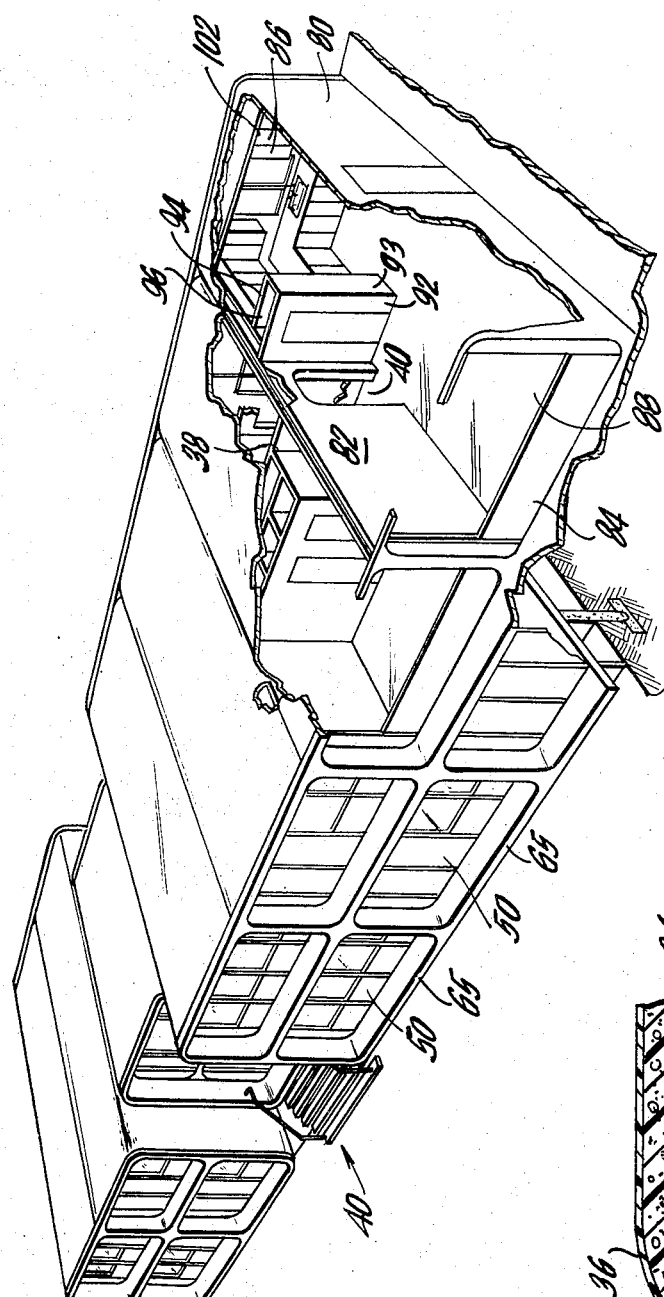
FIG. 3 is a fragmentary section of FIG. 2 along lines A—A showing the sandwich wall construction.
FIG. 4 is a perspective view partially broken away and partially in cross section of a group of completed weather-tight building modules in accordance with the invention showing a floor plan of a typical building module.

As seen in FIG. 3, the sandwich structure comprises an inner shell 30, foam core 32 containing utility equipment 34 and an outer shell 36.

FIG. 4 shows a completed group of modular units each a completed weather-tight unit in which the upper and lower sections are bonded together, for example fused together. The grouping represents two-story garden apartment type development using fiberglass reinforced plastic modules. Structurally, each module is a separate unit. They are bolted together in tandem and on top to form the apartments. An outside entrance 40 is shown at the left.

End faces 50, for example, molded from the same glass fiber reinforced polyester are fused to the ends of the unitary four-sided structure as shown in FIG. 4. The units are provided with end facias 65 which give a unitary appearance to the group and hide the locations at which the modules are bolted together.

The building modules of FIG. 4 include walls 80 and 82 of sandwich construction as described herein, end faces 84, windows 88 and doorway 40. Partitions 92, 93 and 94 form a closet 96. The partition 38, as described above, divides one of the modules into rooms as shown. The module also includes partition 102 for housing a plumbing tree (not shown). The module is equipped with cabinets 86, tiles and the like, which can be molded in place or can be adhered to floors, walls and/or ceiling by screws or conventional adhesives.

As indicated hereinbefore, the foam core can be separately formed on the inner shell with the aid of a foaming jacket and adhered to the interior surfaces of the inner and outer shells, or may be foamed in place between the inner and outer shells. The foams are formed by adding blowing or foaming agents such as freon, as will be described hereinafter, to the plastics to be foamed. Such blowing or foaming agents are well known in the art. The density of the foam product is dependent upon the quality of blowing or foaming agent used.

In foaming the foam, liquid resin is fed to an extruder. The blowing or foaming agent, (sometimes referred to as expansion or gasifying agents) such as ammonium carbonate, is added. When the resin is placed on the inner surface of the shell fitted with a foam jacket or between the walls of the shells, immediate expansion takes place and is completed in a fraction of a second at relatively low pressure.

In addition, the foam can be made by many other methods, such as whipping air or other gases such as freon into a solution or suspension of plastic, dissolving gas in a plastic mix which is caused to foam when the pressure is reduced, producing carbon dioxide within the foam mass by chemical reaction, and other methods described in Chapter 12, Cellular Plastics, of the *Plastic Engineering Handbook*, 3rd. Ed. 1960, Reinhold Publishing Corp., all of which are well known to those skilled in the art.

The insulating core of plastic foam employed in the building material of sandwich structure can be rigid, semi-rigid or even flexible, can be open or closed celled, preferably closed celled, and should have a low density, for example ranging from 0.1 to 10 lb./cu.ft., and preferably 1.5 to 2.5 lb./cu.ft. The foam will have a relatively short setting time, high compressive strength and good fire resistance or retardation characteristics.

The preferred insulating core materials for use in the present invention are rigid urethane foams, which are prepared by reacting polyols, that is hydroxyl-terminated compounds, with a diisocyanate and water in the presence of a catalyst. Polystyrene foams which are inexpensive, easily processed at relatively low temperatures and pressures, can also be used. Epoxy foams, which can be foamed in place, and which have found extensive use as core material in light sandwich structures for building doors, partitions and panels, are also suitable. Other foam materials which can be employed herein include foamed or expanded polyvinyl chloride, phenol-formaldehyde resin foams, urea-formaldehyde foams, foamed elastomers such as natural rubber, styrene-butadiene rubber foam, polychloroprene foam, chlorosulphonated polyethylene-ethylene-propylene terpolymer foam, butyl rubber foams, polyacrylate foams and silicone foams.

For a complete discussion of the various types of foams, their preparation, and characteristics, see Plastics Engineering Handbook, Chapter 12, Cellular Plastics, page 136 et seq., supra.

Additional additives may be included with the foaming formulations as well as with the plastics to be used for forming the shells to impart fire resistance or combustion retarding properties to the element. Such additive materials include antimony trioxide; phosphorus and/or halogen containing materials such as tris-B-chloroethyl phosphate; tris-dichloropropyl phosphate; chlorinated biphenyls and polyphenyls; tris-(2,3-dibromopropyl) phosphate; tetrabromobisphenol A; tetrabromophthalic anhydride, pentabromophens and other phosphate based polyols.

The inner and outer shells are preferably formed by spray-up molding techniques. The spray-up molding process can make use of a multiple-headed gun which blasts filler such as chopped glass fibers, resin and catalyst simultaneously. For example, in one system roving, that is fibrous glass in which spun strands are woven into a tubular rope, is fed through a chopper and ejected into a resin stream, mixed with the resin and the mixture, directed at the mold by a number of different spray systems. One spray system comprises a gun carrying resin premixed with catalyst and another gun carries resin premixed with accelerator. In a preferred spray system the chopped glass and resin are fed into a gun which mixes the glass and resin ahead of the spray nozzle. By either method, the resin mix precoats the chopped glass strands and the merged spray is directed into the mold by the operator to apply a uniform build-up over the entire mold surface. After the desired thickness has been piled up, the exposed product area is smoothed by the use of rollers, and curing is then achieved.

Other conventional molding procedures can be employed in forming the shells as will be apparent to one skilled in the art, such as open or contact molding, wherein layers of glass fiber or cloth and resin loads are placed in the mold, in contact with the air, and worked into intimate contact with the mold surfaces, with or without pressure.

The inner and outer shells sandwiching the insulating core are formed of self-supporting molded plastic, preferably reinforced plastic. The plastic material can comprise a thermoplastic material or a thermosetting material, with thermosetting such as polyester containing fire retardants being preferred. Examples of thermoplastic resins suitable for use herein as inner and outer shell material include, but are not limited to, polyolefins such as polypropylene, medium density, high density or high molecular weight polyethylene, polystyrene as well as polyvinyl resins such as polyvinyl chloride, acrylonitrile-styrene-butadiene resin, polyacetal, acrylic, cellulose acetate, cellulose acetate butyrate, cellulose propionate, chlorinated polyether, ethyl cellulose, ethyl vinyl acetate, chlorotrifluoroethylene, fluorinated ethylene propylene, polytetrafluoroethylene, Nylon 6, Nylon 6/6, Nylon 6/10, polyallomer, polycarbonate, polyimide, polyvinyl dichloride, styrene acrylonitile, phenoxy, polyphenylene oxide or polysulfone.

Examples of suitable thermosetting materials which can be employed in the molded shells include, but are not limited to phenolic resins, phenolic nylon, phenolic rubber/flour, urea cellulose, silicone glass, melamine resins, epoxy resins, alkyd resins and diallyl phthalate.

Preferred are those resins which are reinforced with conventional reinforcements such as boron, carbon, glass, glass fiber, glass cloth, glass mat, chopped glass, paper, graphite, beryllea and alumina fibers, asbestos, asbestos cloth, nylon cloth, woven and nonwoven textiles and sisal. These reinforcements or fillers can be in particulate form such as granules, powders, pellets, spheres, and needles, or in fibrous form.

Resins particularly useful for reinforced plastics include polyester, epoxy, phenolic, melamine and silicone.

As indicated above, polyesters reinforced with glass fiber are most preferred in the present invention for use as the inner and outer shell materials, inasmuch as they are comparatively low in cost, and easy to mold as low temperatures. Furthermore, polyesters have good mechanical, chemical and electrical properties and some are fire retardant.

Glass fiber reinforcement is preferred inasmuch as it gives outstanding strength-to-weight characteristics, high tensile strength, high modulus of elasticity and resiliency, and excellent dimensional stability. However, glass cloth, glass mat, asbestos, paper or cotton cloth may also be employed as reinforcement for polyesters.

The resins to be molded into the shells may include coloring agents thereby making it unnecessary to paint the finished walls, as well as any of the fire-proofing agents mentioned above, ultraviolet ray inhibitors or other additives conventionally employed in making molded plastic wall, ceiling or floor panels.

The thickness of the core may vary depending on the environment in which the building module unit is to be used, the density of the foam, the nature of the synthetic polymeric material forming the foam, and the insulation requirements of the particular application for the building module unit. In general, the thickness of the core for most applications will be within the range of about ½ inch to about 3 inches or more, and preferably from about one to about 2¾ inches. Optimally, about 2 lb. density foam is employed to form 300 to 600 sq. ft. of foam core.

The inner and outer shells will generally have a thickness within the range of about one-sixteenth to about 1 inch or more and preferably from about one-sixteenth to about 1/6 inch, and optimally about ⅛ inch depending on the variables mentioned above with respect to the foam.

The building module can be made to any length, width or height or specifications depending on the application required. However, size is somewhat limited inasmuch as the unit must be transported to the building site from the factory. Accordingly, the unit should preferably, although not necessarily, have a height (floor to ceiling) range from about 7 to about 9 feet, a width (side wall to side wall) ranging from about 8 to about 14 feet or more and a length (end wall to end wall) ranging from about 10 to about 60 feet or more.

The inner and outer reinforced plastic shells can be modified, if desired, by including further reinforcing means in the form of metal, plastic or wood panels bonded to the interior surfaces of the inner and/or outer shells and thereby form a laminate-like structure.

The sandwich structure can be provided with a fire resistant layer which can be secured to or embedded in the interior surfaces of the inner and/or outer shells or embedded in the insulating core during fabrication of the sandwich structure. The fire-resistant layer or sheet is preferably asbestos or an asbestos-based material such as asbestos fiber bound with a chemical binder.

It will be apparent that reinforcing means and fire-retardant means can be used in conjunction with each other or combined into a single laminate or panel structure.

The inner and outer shells are secured to the insulating foam, to form a sandwich structure and the various sections of sandwich structure are secured to each other to form a weather-tight structure.

As indicated above, the inner and outer shells are secured to the insulating core upon curing and hardening of the foam (inner shell to core) and curing and hardening of the outer shell (core to outer shell). However, it will be apparent to one skilled in the art that if desired standard bonding techniques may be employed.

It will be apparent that where reinforcing and/or fire-retardant members or layers are employed which cannot be welded to the plastic shells or foam forming the end faces of the building module unit, these members or layers can be positioned so as to not come into contact with any of the joints forming the bond between the end faces and ends of the four-sided unitary sandwich structure.

The end surfaces of the sections of sandwich panels to be joined can be fashioned into lap joints, V-joints, tongue and groove joints as well as the simple lap joint, to obtain the required joint strength.

Adhesive may be mixed with the foam forming constituents so that the foam core will adhere to the shells without the need for additional bonding agents.

In addition to the adhesive bonding between adjacent elements as discussed above, the construction elements of this invention may be conveniently joined together by bolting, use of snap fittings, by tongue and groove jointing, or by any combination thereof, as will be apparent to one skilled in the art. Examples of other joints and techniques of joining plastic sections and outer shells or skins to cores are set out in U. S. Pat. Nos. 3,473,273 to Gunkel; U.S. Pat. No. 3,310,917 to Simon; U.S. Pat. No. 3,479,779 to Ziegler; U.S. Pat. No. 3,461,633 to Ziegelman; and U.S. Pat. No. 3,533,200 to Zoebelein.

The edges of the sections to be joined can also be provided with holed flanges which can receive nuts and bolts to seal the joints.

In order that the foam core or structural sandwich structure produced may be utilized without further modification at the building construction site, it is preferable that the sandwich wall panels be detailed as part of the process of fabrication.

Thus, for example, as previously noted, the inner shell and possibly even the outer shell can be molded so as to include partition grooves on the exterior or open side of the inner shell. Prior to the formation of the four-sided unitary structure, an adhesive can be placed in grooves and/or on the edges of partitions. Partitions, such as metal, wood, wall board or reinforced plastic, may be employed. The partitions then can be set in the partition grooves so as to divide the completed building module unit into the desired number of rooms, closets, hallways, doorways and the like. Where windows are desired, the inner and outer shells and end faces are molded to include cutouts for windows and the foam core formed around the cutouts. The cutouts may be protected by a removable insert during the filling or introduction of the foam to ensure that the window cutouts will remain free and open. The individual windows and frames can be fitted into the finished sandwich panels at the factory or at the building site.

The completed building module unit will include all doors, door frames, and trim which can be either wood or metal with conventional hardware. The window frames may be either reinforced plastic such as the shells, or polyvinyl chloride or aluminum or wood.

The conduits, junction boxes, terminals, and hardware for electrical, telephone lines, heating, ventilation, air-conditioning and/or gas services and utilities are provided for in the insulating foam core.

In the preferred method of forming the sandwich panels and the building module unit of the invention, the inner shell including any desired detail work is molded such as, for example, by a spray-up molding technique.

Electrical wiring, terminals, outlets, junction boxes and the like for each wall as well as connections for hooking up fixtures are installed on the interior surface of the inner shell prior to depositing the foam core. In addition, a heating system which, for example, can be an electrical heating system in self-contained units or a hot-water fin tube radiation system as well as hot air-gas heating system, gas lines and junctions, air-conditioning and heating ducts, may be installed on the interior surface of the inner shell. Where necessary, these services may be installed between partitions.

The insulating core of foam may then be formed on the interior surface of the innner shell embedding the afore-described electrical, gas, etc. conduits and ducts and the like therein. The outer shell is then spray molded over the foam core and is bonded thereto upon curing and hardening thereof as described hereinbefore. Alternatively, the foam core can be formed in situ between the inner and outer shells embedding the afore-described utility components therein.

To facilitate the coupling of piping and electrical wiring connections to the appropriate services at the building site, and to facilitate subsequent inspection, repair and replacement of this piping and electrical wiring and of the fixtures and heating units, there may be provided a series of removable panels which cover openings formed in one or more of the walls, floor or ceiling.

A plumbing tree, which will include a substantial portion of the plumbing for the entire building module unit can be disposed between partitions. The piping can be of conventional metal or rigid plastic piping material such as polyvinyl chloride piping.

The finished building module unit may optionally be provided with an external protective and/or decorative veneer which may be molded directly on the outer shell or which can be in the form of bricks, concrete, stucco, siding, shakes, shingles, paints, and the like, of different colors and designs. However, such exterior coverings are not needed.

The interior walls of the unit may optionally be provided with protective and/or decorative films or layers of paint, plastic film such as polyvinyl chloride film or may be perforated to provide passageways for sound to travel therethrough into the core to be diffused and absorbed therein. The floors may be installed at the building site or in the factory and can optionally be tiled to provide nonslip floors especially in kitchen and bathroom areas. The bathrooms may be installed at the building site or in the factory and can be provided with plastic shower stalls and/or bathtubs, lavatory, vanity and medicine cabinet and water closet of conventional type. The kitchen can be provided with reinforced plastic molded cabinets and/or conventional wood or metal cabinets as well as conventional appliances including sinks. The kitchen cabinets may also be molded in place.

It is to be particularly noted that all of the above can be carried out in the factory so that the building module unit when delivered to the building site will contain all interior partitions, doors, windows, fixtures, plumbing, electrical and heating equipment.

The building module unit can comprise a complete structure in itself, or it may be combined with other similar units to form multiple-unit structures.

The building module unit is delivered to the building site and installed on a prepared site consisting of all necessary excavation, filling, grading, conventional foundations and utilities. The unit can be bolted to the foundations and all utilities hooked into the unit's mechanical system housing in the insulating core.

In summary, there is here described a building module unit of substantially all light-weight plastic construction, substantially self-contained in that all necessary utilities and service equipment are provided for in the walls and/or partitions of the unit and ready for immediate hook up at the building site, and which is fabricated into virtually complete form at a factory. remote from the building site.

We claim:
1. A prefabricated building module of substantially all plastic construction adapted to be completely assembled as a substantially complete housing unit in a factory for subsequent delivery to a building site, comprising, in combination, mating trough-like upper and lower integrally formed room sections, said sections having generally inverted U and upright U-shaped cross-sectional configurations respectively, the open ends of said U-shaped sections being joined together in confronting relationship so as to form a closed unit having at least two walls, a ceiling, and a floor; said room sections being formed of pairs of molded fiberglass reinforced polymeric material shells mounted in spaced apart juxaposition, said shells comprising inner and outer skins for each room section, a fire retardant insulating polymeric foam core interposed between and bonded to each pair of shells; means embedded in situ in the foam core of at least one of the two room sections between the shells for supplying electric service to the module; said inner plastic shell of each section being formed with retainer means molded integrally therewith for holding an upright panel in position; and at least one upright panel held in position on the interior of the module by said retainer means on the inner shells.

2. A prefabricated building module in accordance with claim 1 wherein the insulating foam core is a polyethylene foam.

3. A prefabricated building module in accordance with claim 1 wherein the insulating foam core is a polyurethane foam.

4. A prefabricated building module in accordance with claim 1 wherein the insulating foam core has embedded therein heating and ventilating ducts, electrical supply lines, telephone lines, and connections and conduits therefor.

5. A prefabricated building module in accordance with claim 1 including a plumbing tree positioned between a pair of partitions mounted in the module.

6. A prefabricated building module in accordance with claim 1 in which the sides of the U-shaped cross sections of one room section are of different length from those of the mating room section.

7. A prefabricated building module in accordance with claim 1 including at least one closure member forming an end wall for the module.

8. A method for forming a prefabricated building module in accordance with claim 1 of substantially all plastic construction adapted to be completely assembled as a substantially complete housing unit in a factory for subsequent delivery to a building site, which comprises spray-up molding, a shell of fiberglass reinforced polymeric materal having a generally U-shaped cross section and having retainer means for holding an upright panel integrally formed thereon, said shell comprising the inner surface layer of a room section; positioning on said molded shell means for supplying electric service to the completed module; positioning a foaming jacket about the molded shell and electric supply means; forming an insulating layer of fire retardant plastic foam material on the molded shell so that it follows the contour and is bonded to the molded shell, said foam layer being of sufficient thickness to enclose within itself the electric supply means; then spray-up molding directly onto the foam layer an outer shell of fiberglass reinforced polymeric material to thereby form a trough-like room section; forming a similar mating U-shaped room section by forming plastic inner and outer shells and intermediate foam layers in like manner; placing at least one divider panel in one of said room sections in a position so as to be held by said retainer means inverting the remaining room section and position said mating room sections in open faced confronting relationship so as to form a general tunnel-like structure; and joining said U-shaped room sections together.

9. A method of forming a prefabricated building module in accordance with claim 8 including bonding the two room sections together.

10. A method of forming a prefabricated building module in accordance with claim 8 including closing off at least one end of the tunnel-like structure with an end closure panel to form a modular housing unit.

* * * * *